US012802553B2

(12) United States Patent
Lu et al.

(10) Patent No.: US 12,802,553 B2
(45) Date of Patent: Nov. 17, 2026

(54) CLEANLINESS STATE VISUALIZATIONS

(71) Applicant: Hewlett-Packard Development Company, L.P., Spring, TX (US)

(72) Inventors: Meng-Ju Lu, Taipei City (TW); Syed S. Azam, Spring, TX (US); Lee Warren Atkinson, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/995,368

(22) PCT Filed: Jul. 20, 2022

(86) PCT No.: PCT/US2022/037717

§ 371 (c)(1),
(2) Date: Jan. 16, 2025

(87) PCT Pub. No.: WO2024/019716

PCT Pub. Date: Jan. 25, 2024

(65) Prior Publication Data

US 2026/0030970 A1 Jan. 29, 2026

(51) Int. Cl.

*G08B 21/24* (2006.01)
*G06F 3/04845* (2022.01)
*G06F 3/0488* (2022.01)
*G08B 21/18* (2006.01)

(52) U.S. Cl.

CPC ....... *G08B 21/245* (2013.01); *G06F 3/04845* (2013.01); *G06F 3/0488* (2013.01); *G08B 21/182* (2013.01)

(58) Field of Classification Search

None

See application file for complete search history.

(56) References Cited

U.S. PATENT DOCUMENTS

2010/0045623 A1* 2/2010 Sakurai ................. G06F 3/0488 345/173
2016/0328084 A1 11/2016 Barat
2021/0141706 A1 5/2021 Frederick et al.
2022/0179767 A1 6/2022 Hermiz et al.
2022/0391020 A1* 12/2022 Tarayan ................. B60K 35/25

* cited by examiner

*Primary Examiner* — Thomas S McCormack

(74) *Attorney, Agent, or Firm* — Quarles & Brady LLP

(57) ABSTRACT

In some examples, a method includes detecting, by a processor, bodily contact on a surface based on sensor data. In some examples, the method includes determining, by the processor, a cleanliness state associated with the surface based on the detected bodily contact. In some examples, the method includes generating, by the processor, a visualization of the cleanliness state. In some examples, the method includes outputting the visualization.

20 Claims, 5 Drawing Sheets

CLEANLINESS STATE VISUALIZATIONS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
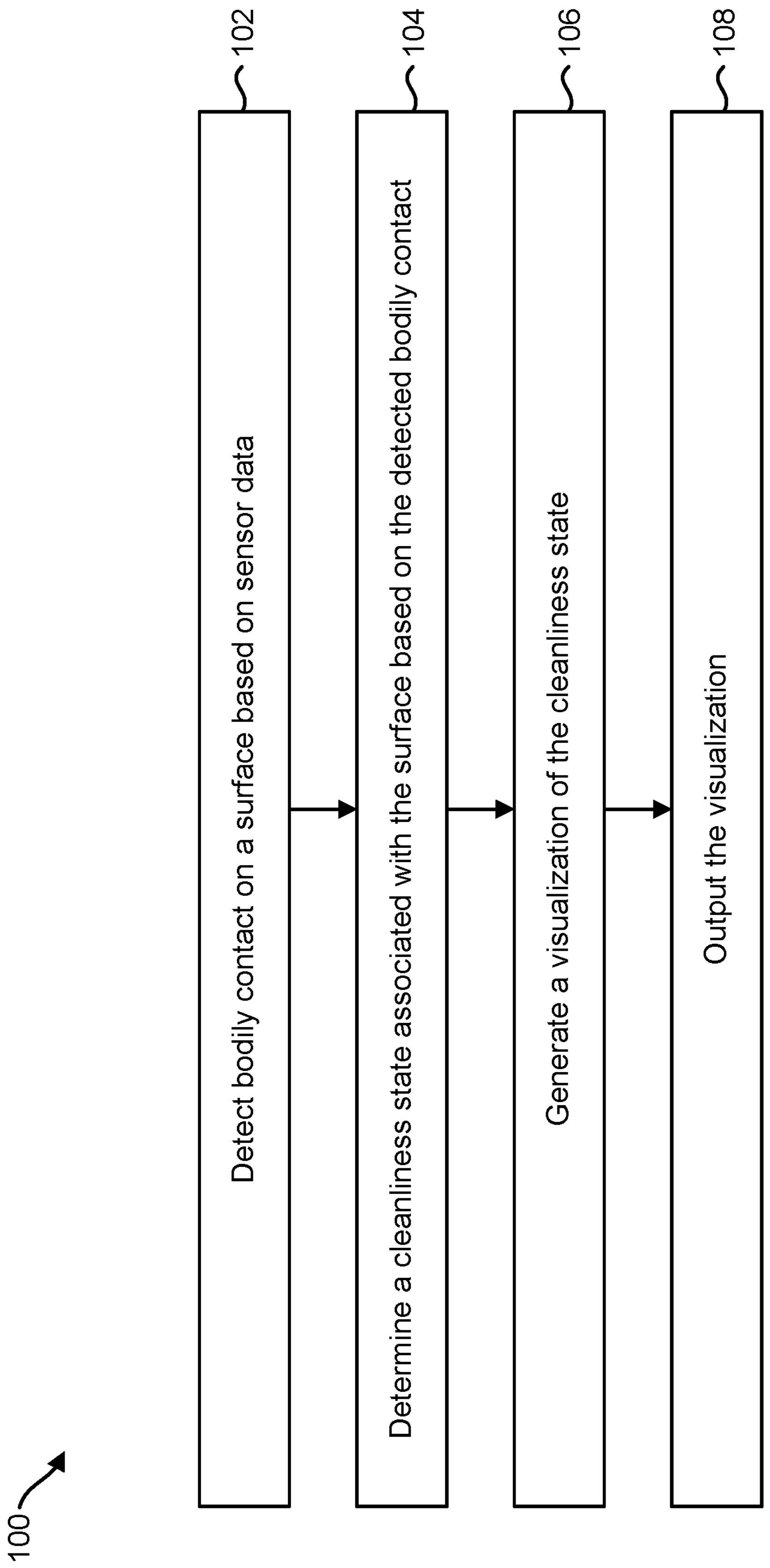
FIG. 1 is a flow diagram illustrating an example of a method for cleanliness state visualization generation.

When bodily contact occurs with a surface, microbes (e.g., bacteria, viruses, etc.) may be deposited to the surface, which may provide a risk to transmit disease. For instance, a smartphone screen may be contaminated from a person that has an illness (e.g., influenza, viral gastroenteritis, coronavirus disease (COVID), hepatitis, etc.). Another person may catch the illness through contact with the contaminated smartphone screen. Some surfaces (e.g., a surface with an anti-fingerprint coating or screen protector, anti-glare monitor, textured surface, patterned surface, etc.) may reduce or hide the appearance of previous contact (e.g., fingerprints, smudges, grime, smears, soiling, etc.).

In some examples of the techniques described herein, an electronic device may monitor bodily contact on a surface (e.g., user input(s) through an interface device like a touchscreen, touchpad, keyboard, mouse, etc.). The electronic device may show a visualization (e.g., dots on a screen, backlighting, etc.) to remind a user to clean the surface. For instance, the opacities of dots on a screen and/or the intensities of backlighting may be adjusted as more user inputs are detected.

Throughout the drawings, identical or similar reference numbers may designate similar elements and/or may or may not indicate identical elements. When an element is referred to without a reference number, this may refer to the element generally, and/or may or may not refer to the element in relation to any Figure. The figures may or may not be to scale, and the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for cleanliness state visualization generation. For example, the method 100 may be performed to produce a visualization of a cleanliness state. The method 100 and/or an element or elements of the method 100 may be performed by an apparatus (e.g., electronic device, computing device, smartphone, tablet device, laptop computer, server computer, etc.). For example, the method 100 may be performed by the apparatus 324 described in relation to FIG. 3.

The apparatus (e.g., a processor) may detect 102 bodily contact on a surface based on sensor data. Bodily contact is physical contact (e.g., a touch, tap, interaction, etc.) with a body (e.g., person, animal, biological substance, etc.). A surface is an object boundary. For instance, a surface may be touch sensitive (e.g., touchscreen, surface with a pressure sensor, surface with a heat sensor, surface with a touch sensor, touch pad, keyboard, mouse, etc.) or non-touch sensitive (e.g., wall, table, furniture, window, steering wheel, vehicle interior, vehicle exterior, chair, door handle, door, device housing, toilet seat, countertop, shower floor, etc.). Sensor data is data provided by a sensor. Examples of a sensor include a touch sensor (e.g., capacitive touch sensor, piezoelectric touch sensor, etc.), pressure sensor (e.g., button actuator, switch, etc.), heat sensor, motion sensor, vibration sensor, moisture sensor, image sensor, light sensor, etc. For instance, the sensor data may be provided by a contact sensor in the surface. In some examples, an apparatus may detect bodily contact when a signal threshold is reached (e.g., change in capacitance, change in resistance, change in an accelerometer signal, etc.), when a threshold image change occurs (e.g., when a threshold pixel change occurs), when a button is actuated (e.g., keyboard button is depressed, a mouse button is clicked, an electromechanical switch indicates a change, etc.), and/or when a threshold temperature is reached (e.g., indicated by sensor data from an infrared image sensor or temperature sensor, etc.).

In some examples, the surface is a non-touch sensitive surface within a field of view of an image sensor that provides the sensor data. For instance, detecting bodily contact may include utilizing computer vision on the sensor data to infer the bodily contact. In some examples, computer vision may include machine learning. Machine learning is a technique where a machine learning model is trained to perform a task or tasks based on a set of examples (e.g., training data). Training a machine learning model may include determining weights corresponding to structures of the machine learning model. Artificial neural networks are a kind of machine learning model that are structured with nodes, layers, and/or connections. Examples of neural networks include convolutional neural networks (CNNs) (e.g., basic CNN, deconvolutional neural network, inception module, residual neural network, etc.), generative adversarial networks (GANs), and recurrent neural networks (RNNs). Different depths of a neural network or neural networks may be utilized in accordance with some examples of the techniques described herein. In some examples, an apparatus (e.g., processor) may execute a machine learning model that has been trained to detect (e.g., infer, recognize, etc.) bodily contact from sensor data (e.g., image(s), video, etc.).

In some examples, the apparatus (e.g., processor) may determine 104 a cleanliness state associated with the surface based on the detected bodily contact. A cleanliness state is a value or indicator (e.g., quantity, number in a range, word, symbol, etc.) representing a degree of cleanliness. For instance, a cleanliness state may represent a degree of cleanliness according to a cleanliness model. For example, a cleanliness model may define a range of cleanliness states (e.g., discrete cleanliness states, numeric cleanliness states, percentage, proportion, etc.) according to a metric (e.g., quantity of bodily contacts, frequency of bodily contacts, duration of bodily contact, time since last bodily contact, location of bodily contact, and/or bodily contact identity, etc.).

In some examples, a cleanliness model may define discrete cleanliness states (e.g., "clean," "used," and/or "dirty," etc.). For instance, a first quantity or range of (e.g., zero) bodily contacts (after cleaning) corresponds to the "clean" cleanliness state, a second quantity or range of (e.g., 1-4, 999) bodily contacts corresponds to the "used" cleanliness state, and/or a third quantity or range of (e.g., 5,000+) bodily contacts corresponds to the "dirty" cleanliness state. In some examples, a cleanliness model may be expressed on a percentage scale (e.g., each 50 additional contacts increase a "dirty" percentage by 1%). For instance, 500 bodily contacts set the cleanliness state to 10% dirty, 2,500 bodily contacts set the cleanliness state to 50% dirty, and so on. In some examples, a cleanliness model may be expressed based on contact duration. For instance, a touch pad may be in a "clean" cleanliness state after cleaning until entering a "dirty" cleanliness state when three hours of cumulative bodily contact have occurred. In some examples, a cleanliness model may be expressed based on a user identity(ies). For instance, a steering wheel of a rental car may enter a dirty state after a renter has contacted the steering wheel, and may enter a clean state after an identified worker has contacted the steering wheel. In some examples, a cleanliness model may be expressed in terms of time after a bodily contact without further bodily contact. For instance, an exterior doorknob may enter a dirty state after a bodily contact(s), and may return to a clean state after lack of further bodily contact for four hours. Other approaches may be utilized in some examples.

In some examples, a cleanliness model and/or cleanliness states may be established according to a received input. For instance, a cleanliness model and/or cleanliness states may be established in apparatus settings based on an input(s) received from a user (e.g., device manufacturer, end user, etc.). In some examples, a cleanliness model and/or cleanliness states may or may not correspond to an actual quantity of soiling and/or infectiousness of a surface. For example, a cleanliness model and/or cleanliness states may or may not be based on empirical data that quantify the actual cleanliness and/or dirtiness of a surface.

The apparatus (e.g., processor) may generate 106 a visualization of the cleanliness state. A visualization is an optical indicator. Examples of a visualization may include an image(s), light (e.g., backlighting, projected light, etc.), and/or a surface model (e.g., three-dimensional (3D) model indicating a surface(s)), etc. In some examples, a visualization includes a graphic on a screen. For instance, a visualization may depict dots in an area(s) where a bodily contact(s) has occurred on a screen or on a 3D model of a surface. As the cleanliness state changes (e.g., as further bodily contacts occur, as the cleanliness state progresses from clean to dirty or dirty to clean, etc.), in some examples, the visualization may be adjusted. For instance, the apparatus may adjust an opacity, brightness, color, shape, and/or size of the visualization. In some examples, the visualization may be mapped from and/or correspond to the cleanliness state. For instance, a type, color, shape, size, and/or opacity, etc., may be mapped from the cleanliness state (e.g., quantity of bodily contacts, etc.). In some examples, a visualization may depict dots on a touchscreen, where an opacity of some or all of the dots is increased as the cleanliness state progresses from clean to dirty. An example of a visualization using dot opacity is given in FIG. 5. In some examples, a visualization may include backlighting on a keyboard, where a color and/or brightness of the backlighting is adjusted according to the cleanliness state. For instance, backlighting on a keyboard may start as white with a higher brightness in a clean cleanliness state, and may gradually dim and/or turn red as more button presses are detected. In some examples, individual button backlighting may be adjusted for those buttons that are pressed more.

The apparatus may output 108 the visualization. For instance, the apparatus may provide the visualization to a display panel, may send the visualization to a display device (e.g., monitor, projector, etc.), and/or may send a control signal to a peripheral device (e.g., keyboard, mouse, digital pen, etc.) to output 108 the visualization. In some examples, the apparatus displays a 3D model of the surface with the visualization (e.g., dot(s), texture(s), overlay(s), highlight(s), etc.).

In some examples, the apparatus (e.g., processor) may produce a notification with or without a visualization. For instance, the apparatus may determine 104 a cleanliness state and may produce a notification based on the cleanliness state. A notification is an alert to provide an indication of the cleanliness state. Examples of a notification include a pop-up image (e.g., window), a sound (e.g., tone, beep, tune, alarm, etc.), a haptic event (e.g., vibration), and/or a light (e.g., flashing light, light emitting diode (LED) indicator, etc.), etc. For instance, the apparatus may produce the notification in response to determining that a target cleanliness state (e.g., "dirty") is entered, that a threshold is reached (e.g., 80% dirty, 100% dirty, etc.), or a combination thereof. The notification may serve to indicate that cleaning is encouraged.

In some examples, the surface may be a screen (e.g., touchscreen), and the apparatus (e.g., processor) may produce a determination that a first portion of the screen has reached a threshold dirty state (e.g., 50% dirty, 2000 contacts, three different users contacted the first portion, etc.). In some examples, the apparatus (e.g., processor) may move a user interface from the first portion to a second portion of the screen in response to the determination. For instance, the second portion of the screen may be a location with fewer bodily contacts (e.g., may be "cleaner") than the first portion. Moving the user interface may reduce spread of soiling and/or microbes from the screen to a user.

In some examples, the apparatus (e.g., processor) may enter a cleaning mode. A cleaning mode is a mode in which surface cleaning may be detected and/or indicated. In some examples, the apparatus may receive an input instructing the apparatus to enter the cleaning mode. In some examples, the apparatus may automatically enter the cleaning mode. In some examples, the apparatus may suspend another operation(s) until a change in the cleanliness state is detected and/or indicated. For instance, the apparatus may suspend displaying another application interface(s) until a change in the cleanliness state is detected and/or indicated. In some examples, in cleaning mode, a visualization may be adjusted to more clearly depict the visualization. For example, the visualization (e.g., dirty areas) may be displayed with 100% opacity and/or intensity. In some examples, the apparatus (e.g., processor) may control cleaning of a surface. For instance, the apparatus may clean a surface by controlling application of a cleaning substance (e.g., spraying 75% alcohol on a surface using a controllable nozzle(s), actuating a wiper with bleach, etc.) while in the cleaning mode.

In some examples, a bodily contact may be associated with a user. For instance, a user identity may be indicated via a current profile (e.g., sign-in) being used by an apparatus, through user recognition (e.g., facial recognition, voice recognition, biometric recognition, etc.) from sensor data, etc. In some examples, the apparatus (e.g., processor) may detect a second bodily contact associated with a second user.

In some examples, the visualization may include a first indicator corresponding to the first user and a second indicator corresponding to the second user. For instance, the apparatus (e.g., processor) may produce different indicators in the visualization corresponding to different users. In some examples, the different indicators may be denoted using different colors, shapes, sizes, and/or textures, etc. In some examples, the cleanliness state and/or visualization may be determined based on cumulative bodily contacts from multiple users. In some examples, independent cleanliness states and/or visualizations may be determined based on respective bodily contacts from respective users.

In some examples, the apparatus (e.g., processor) may determine a change in the cleanliness state. For instance, determining the change in the cleanliness state may include detecting a cleaning contact based on sensor data (e.g., second sensor data). A cleaning contact is physical contact (e.g., a touch, tap, interaction, etc.) on the surface (e.g., during the cleaning mode, to clean the surface, etc.). In some examples, the apparatus (e.g., processor) may utilize sensor data from a touch sensor, capacitive sensor, pressure sensor, heat sensor, motion sensor, vibration sensor, moisture sensor, alcohol sensor, and/or image sensor, etc., to detect the cleaning contact. For instance, an alcohol sensor may be utilized to detect and/or determine a cleanliness state.

In some examples, an apparatus may detect the cleaning contact when a signal threshold is reached (e.g., change in capacitance, change in resistance, change in an accelerometer signal, etc.), when a threshold image change occurs (e.g., when a threshold pixel change occurs), when a button is actuated (e.g., keyboard button is depressed, a mouse button is clicked, an electromechanical switch indicates a change, etc.), and/or when a threshold temperature is reached (e.g., indicated by sensor data from an infrared image sensor or temperature sensor, etc.). For instance, an apparatus may monitor touchscreen or touchpad touch events, keyboard button press events, mouse click events, etc.). In some examples, sensor data from a light sensor may be utilized to detect when sanitizing ultraviolet (UV) light is applied to the surface, sensor data from a temperature sensor or moisture sensor may be utilized to detect when a liquid (e.g., water, cleaner, etc.) is applied to the surface, sensor data from a temperature sensor and/or moisture sensor may be utilized to detect when the surface is heated (e.g., reaches a temperature threshold such as 50° Celsius) and/or in a humidity state (e.g., within a humidity range, wetted, dried, etc.), sensor data from a pressure sensor may be utilized to detect when a surface is being wiped, and/or sensor data from a touch sensor may be utilized to detect when a surface is being cleaned with a swab, etc. While in a cleaning mode, for instance, the apparatus may detect that a user is cleaning the surface (e.g., mopping the touchscreen), and may decrease the opacities and/or intensities when detecting the cleaning contacts. In some examples, detecting liquid and/or mopping may be performed using a capacitive sensor and/or recognizing a diffused area with a threshold capacitance (e.g., low to medium capacitance). For instance, a cleaning rag may be detected based on a capacitive footprint. In some examples, a capacitive sensor may provide data (e.g., rich data, multidimensional data, 3D data, etc.) such that a pointed finger has a sharp, strong center and fades quickly on the edges, a palm may be detected as a large surface with slower fading in capacitance, and/or a rag may be detected with a lower diffused signal (with higher capacitance when wetted, for instance). The sensor data (e.g., second sensor data) to detect the cleaning contact may be provided by a same or different sensor as a sensor utilized to detect a bodily contact.

In some examples, detecting a cleaning contact may include utilizing computer vision on the sensor data to infer the cleaning contact. In some examples, an apparatus (e.g., processor) may execute a machine learning model that has been trained to detect (e.g., infer, recognize, etc.) a cleaning contact from sensor data (e.g., image(s), video, etc.). For instance, the machine learning model may be trained to detect a cleaning wipe, cleaning rag, cleaner application (e.g., cleaning spray), and/or cleaning motion (e.g., scrubbing or wiping motion), etc.

In some examples, the apparatus (e.g., processor) may determine the change in the cleanliness state based on a received input. For instance, a user interface may receive an input (e.g., touch, click, audio, etc.) indicating that the surface has been cleaned. For example, a user may provide an indication to the apparatus that cleaning has been completed.

In some examples, the apparatus (e.g., processor) may determine the change in the cleanliness state in response to the detected cleaning contact and/or input. For instance, the apparatus may reset the cleanliness state to a "clean" state and/or may change the cleanliness degree away from a dirty state. For instance, the apparatus may reset a number of bodily contacts to zero and set the cleanliness state to "clean." In some examples, the apparatus may determine the change in the cleanliness state according to a cleanliness model. For example, a cleanliness model may determine the change in the cleanliness state (e.g., discrete cleanliness state, numeric cleanliness state, percentage, proportion, etc.) according to a metric (e.g., quantity of cleaning contacts, frequency of cleaning contacts, duration of cleaning contact, time since last bodily contact, location of cleaning contact, and/or cleaning contact identity, etc.). For instance, the apparatus may reduce a "dirty" percentage (e.g., each cleaning contact reduces the "dirty" percentage by 25%). In some examples, a cleanliness model may be expressed based on cleaning contact duration. For instance, a touch pad may enter a "clean" cleanliness state after five minutes of cumulative cleaning contact. Other approaches may be utilized in some examples.

In some examples, the apparatus (e.g., processor) may modify the visualization to indicate the change in the cleanliness state. For instance, the apparatus may modify an opacity, light (e.g., backlight, projector light, etc.), brightness, a color, a shape, and/or size of the visualization. For instance, modifying the visualization may include reducing the opacity of the visualization, increasing a light brightness, decreasing a light brightness, etc. In some examples, the apparatus (e.g., processor) may adjust the cleanliness state based on a quantity of time after a bodily contact without further bodily contact and may modify the visualization based on the cleanliness state. For instance, the apparatus may gradually reduce the opacity of the visualization over time without further bodily contact.

Figure 2:
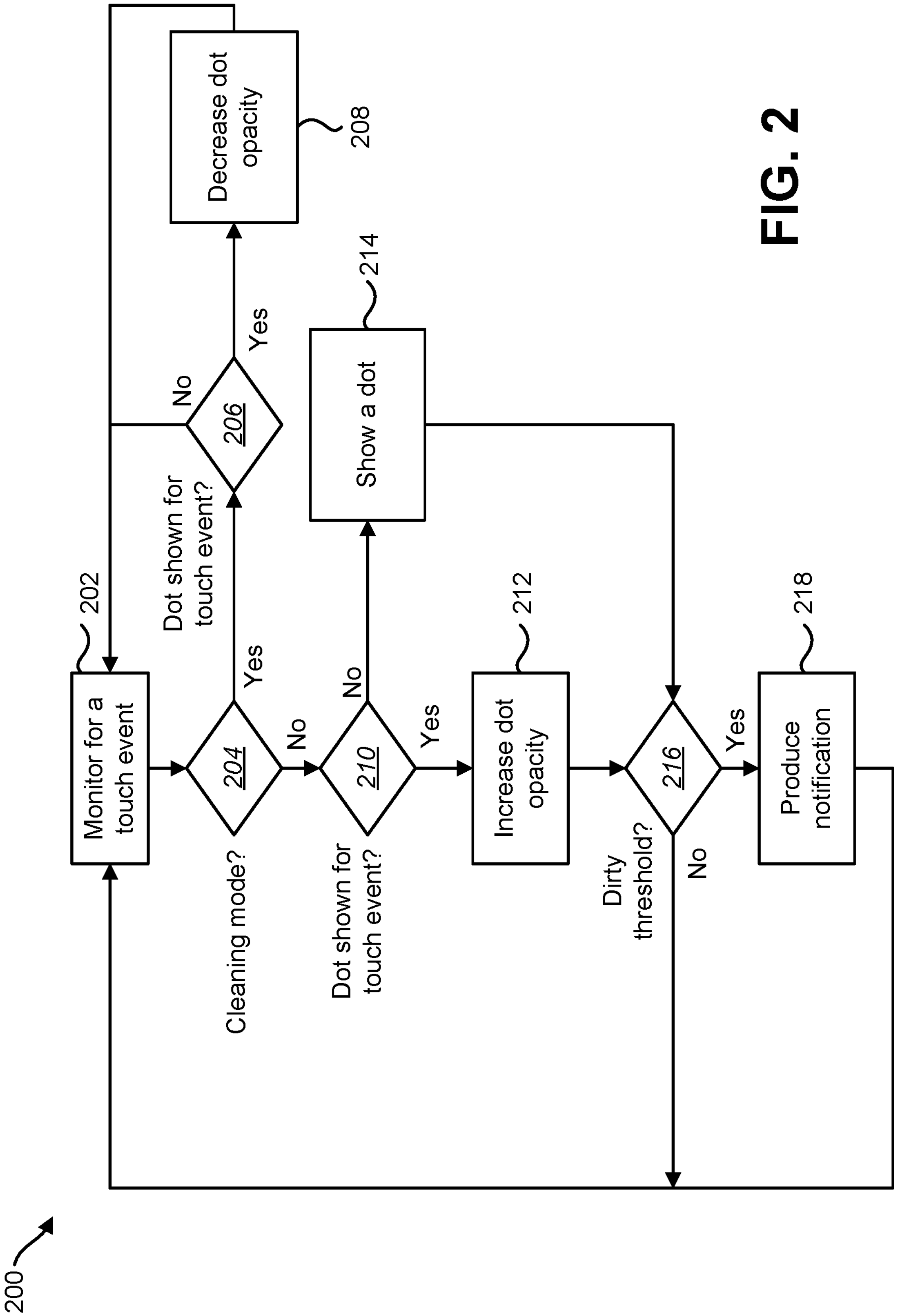
FIG. 2 is a flow diagram illustrating an example of a method for cleanliness state visualization.

FIG. 2 is a flow diagram illustrating an example of a method 200 for cleanliness state visualization. In some examples, one, some, or all of the functions described in relation to FIG. 2 may be performed by the apparatus 324 described in relation to FIG. 3. For instance, the method 200 may be performed by an apparatus, electronic device, computing device, etc.

An apparatus may monitor 202 for a touch event. For instance, the apparatus may detect when a touch is detected on a touchscreen. In some examples, detecting a touch may be performed as described in relation to FIG. 1.

The apparatus may determine 204 whether the apparatus is in a cleaning mode. For instance, the apparatus may determine whether an input is received instructing the apparatus to enter to cleaning mode and/or whether the apparatus is automatically entering the cleaning mode (in response to a timer expiration, threshold cleanliness state, and/or quantity of touch events, etc.). In some examples, determining 204 whether the apparatus is in a cleaning mode may be performed as described in relation to FIG. 1.

In a case that the apparatus is in the cleaning mode, the apparatus may determine 206 whether a dot is shown for the touch event. For instance, the apparatus may determine whether a dot has been previously shown within a distance (e.g., <0.5 centimeters (cm), etc.) from a location from the touch event. An example of a visualization may include a dot(s) in some approaches. In a case that a dot has not been shown for the touch event, operation may return to monitoring 202 for a touch event.

In a case that a dot has been shown for the touch event, the apparatus may decrease 208 dot opacity. For instance, the touch event may be detected as a cleaning contact, and the opacity of the corresponding dot (e.g., dot within the distance) may be reduced (e.g., gradually reduced or erased). In some examples, decreasing 208 the dot opacity may simulate soiling removal from the touchscreen being cleaned. Operation may return to monitoring 202 for a touch event.

In a case that the apparatus is not in cleaning mode, the apparatus may determine 210 whether a dot is shown for the touch event. For instance, the apparatus may determine whether a dot has been previously shown within a distance (e.g., <0.5 cm, etc.) from a location from the touch event.

In a case that a dot has been shown for the touch event, the apparatus may increase 212 dot opacity. For instance, the touch event may be detected as a bodily contact, and the opacity of the corresponding dot (e.g., dot within the distance) may be increased (e.g., gradually increased, increased from 20% opacity to 20.2% opacity, etc.). In some examples, increasing 212 the dot opacity may simulate soiling the touchscreen being used. Operation may proceed to determining 216 whether a dirty threshold is reached.

In a case that a dot has not been shown for the touch event, the apparatus may show 214 a dot. For instance, the apparatus may add (e.g., generate, render, output, and/or display, etc.) a dot at the location of the touch event on the touchscreen. In some examples, the newly added dot may have an initial opacity (e.g., 0.2%).

The apparatus may determine 216 whether a dirty threshold is reached. For instance, the apparatus may determine whether a cleanliness state has reached a dirty state, whether a threshold quantity of contacts has occurred (e.g., occurred at the location of the dot and/or cumulatively over the touchscreen, etc.). In some examples, the apparatus may utilize a visualization (e.g., dot opacity) to track a cleanliness state and/or determine whether the dirty threshold has been reached. For instance, if a dot opacity reaches a threshold (e.g., 80%), if a cumulative dot opacity (e.g., a sum of dot opacities) reaches a cumulative threshold (e.g., 1200%), and/or if an average dot opacity reaches an average threshold (e.g., 65%), the dirty threshold may be reached. In a case that the dirty threshold has not been reached, operation may return to monitoring 202 for a touch event.

In a case that the dirty threshold has been reached, the apparatus may produce 218 a notification. For example, the apparatus may produce a popup message to remind a user to clean the apparatus. Operation may return to monitoring 202 for a touch event.

Figure 3:
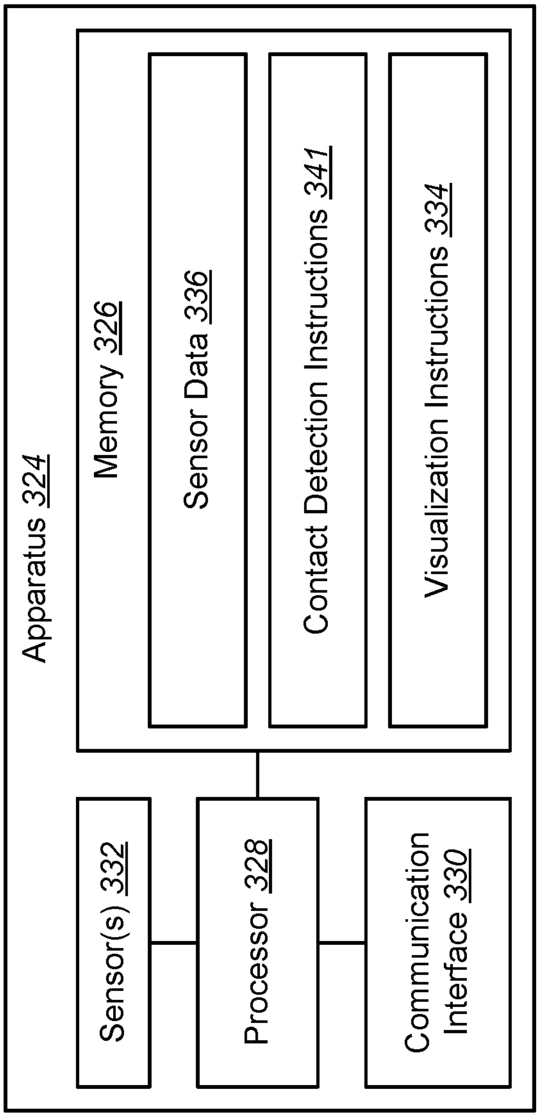
FIG. 3 is a block diagram of an example of an apparatus that may be used for cleanliness state visualizations.

FIG. 3 is a block diagram of an example of an apparatus 324 that may be used for cleanliness state visualizations. The apparatus 324 may be a computing device, such as a personal computer, a server computer, a smartphone, a tablet computer, etc. The apparatus 324 may include and/or may be coupled to a processor 328, a communication interface 330, a memory 326, and/or a sensor(s) 332. In some examples, the apparatus 324 may be in communication with (e.g., coupled to, have a communication link with) another device (e.g., server, remote device, another apparatus, etc.). The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1-5.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term "non-transitory" does not encompass transitory propagating signals. In some examples, the memory 326 may include multiple devices (e.g., a RAM card and a solid-state drive (SSD)).

The apparatus 324 may include a communication interface 330 through which the processor 328 may communicate with an external device or devices (not shown), for instance, to receive and store sensor data 336. The communication interface 330 may include hardware and/or machine-readable instructions to enable the processor 328 to communicate with the external device or devices. The communication interface 330 may enable a wired or wireless connection to the external device or devices. The communication interface 330 may further include a network interface card and/or may also include hardware and/or machine-readable instructions to enable the processor 328 to communicate with various input and/or output device(s), such as a keyboard, a mouse, a display, projector, external sensor, another apparatus, electronic device, computing device, printer, etc. In some examples, an input device may be utilized by a user to input instructions into the apparatus 324.

In some examples, the memory 326 may store sensor data 336. The sensor data 336 may be obtained (e.g., captured, received, etc.) from a sensor(s) 332 and/or from an external sensor(s). For example, the processor 328 may execute instructions (not shown in FIG. 3) to obtain (e.g., receive) sensor data 336. For instance, the apparatus 324 may capture the sensor data 336 utilizing an integrated sensor(s) 332 and/or may receive the sensor data 336 from an external sensor(s) via the communication interface 330. In some examples, the apparatus 324 may include a sensor(s) 332 and/or may be coupled to an external sensor(s).

The memory 326 may store contact detection instructions 341. For example, the contact detection instructions 341 may be instructions for detecting a contact(s) (e.g., bodily contact(s) and/or cleaning contact(s)). In some examples, the processor 328 may execute the contact detection instructions 341 to produce a detection of a bodily contact on a surface based on the sensor data 336. In some examples, producing the detection of a bodily contact may be performed as described in relation to FIG. 1 and/or FIG. 2.

In some examples, the memory 326 may store visualization instructions 334. The visualization instructions 334 may be instructions for generating and/or adjusting a visualization. In some examples, the processor 328 may execute the visualization instructions 334 to generate a visualization of a cleanliness state associated with the surface based on the detection. In some examples, generating a visualization of a cleanliness state may be performed as described in relation to FIG. 1 and/or FIG. 2. For instance, the processor 328 may map a cleanliness state (e.g., quantity of bodily contacts, location of bodily contacts, frequency of bodily contacts, duration of bodily contacts, etc.) to a corresponding visualization (e.g., opacity, quantity, color, size, shape, brightness, etc., of a visualization).

In some examples, the apparatus 324 may output the visualization. For instance, the apparatus 324 (e.g., processor) may cause the visualization to be displayed and/or to be sent to another device for display.

In some examples, the processor 328 may execute the visualization instructions 334 to adjust the visualization based on a change in the cleanliness state. In some examples, adjusting the visualization may be performed as described in relation to FIG. 1 and/or FIG. 2. For instance, the processor 328 may adjust the visualization by changing an opacity of the visualization based on the change in the cleanliness state. In some examples, the change in the visualization state may occur in a cleaning mode.

Some examples of the techniques described herein may be utilized in devices that do not have a native screen on the device. Some examples of the techniques may be utilized for interface devices (e.g., keyboards, mice, touchpads, etc.). For instance, the apparatus 324 may monitor keyboard press events, mouse click events, touchpad touch events, etc., and may virtually show a model (e.g., two-dimensional picture, 3D model, etc.) of the apparatus 324 on an attached display and may highlight with the visualization (e.g., dots, an overlay, etc.) an area(s) where the user touched the mouse, keyboard, and/or touchpad. In some examples, the apparatus 324 may use LED indicators on an interface device to highlight high touch areas with colors of lighting and/or intensities. For instance, red lighting may be produced for dirty keyboard buttons and/or mouse buttons, etc. In some examples, lighting intensities may be increased for a keyboard button that is pressed several times and/or mouse buttons that is clicked several times, etc.

Some examples of the techniques described herein support scenarios where multiple users share the same interface device (e.g., a hospital management system, a cash register system in a restaurant, etc.). Different highlight colors may be utilized for different users. In some examples, different users may be detected by user account login and/or facial recognition, etc. Accordingly, a visualization may indicate whether multiple users have used the same interface device.

Figure 4:
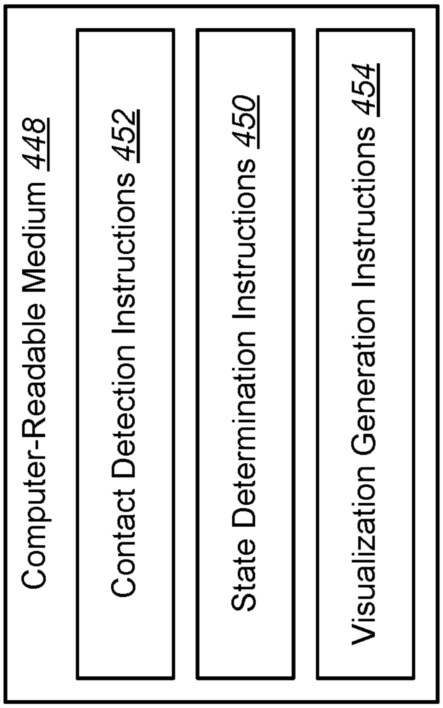
FIG. 4 is a block diagram illustrating an example of a computer-readable medium for cleanliness state visualizations.

FIG. 4 is a block diagram illustrating an example of a computer-readable medium 448 for cleanliness state visualizations. The computer-readable medium 448 is a non-transitory, tangible computer-readable medium. The computer-readable medium 448 may be, for example, RAM, EEPROM, a storage device, an optical disc, and the like. In some examples, the computer-readable medium 448 may be volatile and/or non-volatile memory, such as DRAM, EEPROM, MRAM, PCRAM, memristor, flash memory, and the like. In some examples, the memory 326 described in relation to FIG. 3 may be an example of the computer-readable medium 448 described in relation to FIG. 4. In some examples, the computer-readable medium 448 may include code, instructions and/or data to cause a processor to perform one, some, or all of the operations, aspects, elements, etc., described in relation to one, some, or all of FIG. 1, FIG. 2, FIG. 3, FIG. 4, and/or FIG. 5.

The computer-readable medium 448 may include code (e.g., data, executable code, and/or executable instructions). For example, the computer-readable medium 448 may include contact detection instructions 452, state determination instructions 450, and/or visualization generation instructions 454.

The contact detection instructions 452 may include instructions, that when executed, cause a processor of an electronic device to detect a bodily contact on a touchscreen based on sensor data. In some examples, detecting the bodily contact may be performed as described in relation to FIG. 1, FIG. 2, and/or FIG. 3.

The state determination instructions 450 may include instructions, that when executed, cause a processor of an electronic device to determine a cleanliness state associated with the touchscreen based on the detected bodily contact. In some examples, determining the cleanliness state may be performed as described in relation to FIG. 1, FIG. 2, and/or FIG. 3.

The visualization generation instructions 454 may include instructions, that when executed, cause a processor of an electronic device to generate a visualization of the cleanliness state. In some examples, generating the visualization may be performed as described in relation to FIG. 1, FIG. 2, and/or FIG. 3. In some examples, the visualization may vary based on a location of the detected bodily contact. For instance, the visualization may be positioned at a location of the detected bodily contact on the touchscreen. In some examples, a dot, texture, overlay, etc., may be positioned at the location of the detected bodily contact.

In some examples, the visualization generation instructions 454 may include instructions, that when executed, cause a processor of an electronic device to display the visualization. In some examples, displaying the visualization may be performed as described in relation to FIG. 1, FIG. 2, and/or FIG. 3.

In some examples, the computer-readable medium 448 may include instructions, that when executed, cause a processor of an electronic device to produce a determination that the cleanliness state has reached a threshold dirty state. In some examples, determining that the cleanliness state has reached a threshold dirty state may be performed as described in relation to FIG. 1, FIG. 2, and/or FIG. 3. In some examples, the computer-readable medium 448 may include instructions, that when executed, cause a processor of an electronic device to display a notification in response to the determination. In some examples, displaying the notification may be performed as described in relation to FIG. 1, FIG. 2, and/or FIG. 3.

Figure 5:
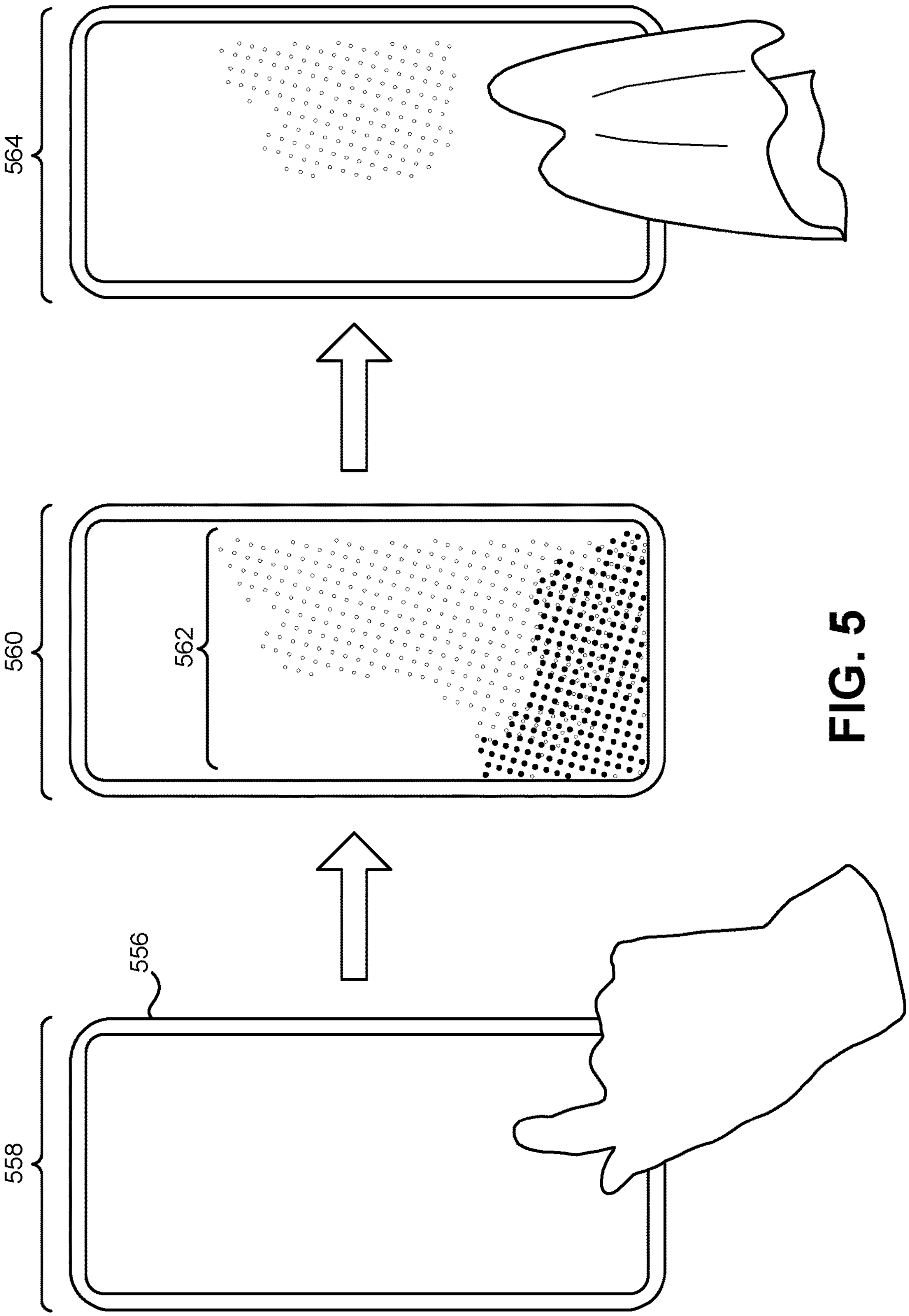
FIG. 5 is a block diagram illustrating an example of a smartphone in different cleanliness states over time.

FIG. 5 is a block diagram illustrating an example of a smartphone 556 in different cleanliness states over time. In a first cleanliness state 558, the smartphone 556 is in a clean state as a user begins to interact with a touchscreen of the smartphone 556.

The smartphone 556 may monitor touch events on the touchscreen and may indicate touch areas by displaying dots with differing opacities to produce a visualization 562. In some examples, differing colors, sizes, and/or shapes may be utilized. For instance, dots with less opacity (e.g., more transparency) may appear in an area with fewer bodily contacts, while dots with more opacity (e.g., less transparency) may appear in an area with more bodily contacts.

In some examples, a visualization may appear on a front or top graphic layer. For instance, the visualization 562 may appear in front of an image and/or text displayed on the smartphone 556. In some examples, a visualization may not interfere with inputs. For instance, the visualization 562 may not interfere with further touch inputs on a graphical user interface shown on the touchscreen of the smartphone 556. Accordingly, a user may be able to interact with (e.g., touch) buttons behind a visualization. The smartphone 556 may increase the opacity of a dot(s) in an area(s) being touched several times.

In the example of FIG. 5, the smartphone 556 may eventually reach a second state 560 (e.g., a dirty state). As shown in the visualization 562 of FIG. 5, lighter dots represent dots with lesser opacity (in lesser touched areas, for instance), while heavier dots represent dots with greater opacity (in more heavily touched areas, for instance).

In some examples, the smartphone 556 may produce a notification (e.g., alert, pop-up, etc.) indicating that the smartphone 556 has reached the second state 560. For instance, the smartphone 556 may produce a notification (e.g., reminder) like a pop-up message and blinking lighting when the size of the dirty area(s) and the sum of opacities and/or intensities are greater than a threshold. In some examples, the threshold may be determined using a variety of techniques. In some examples, the threshold may be set based on an input (e.g., a user input) that indicates a target threshold for a user.

In some examples, a visualization (e.g., the visualization 562) may be hidden (e.g., not displayed, suspended from display, etc.). For instance, the visualization 562 may be withheld until the smartphone 556 receives an input requesting display of the visualization 562. In some examples, the visualization 562 (and/or notification) may be dismissed and/or postponed (for later presentation, for instance).

For some interfaces that include a touch sensor (e.g., touchscreens and touchpads), the touch sensor may provide a touch area. If touch bounds are not available, an apparatus may utilize an apparatus physical size (e.g., touchscreen or touchpad size), apparatus logical size, and/or average finger touch size to estimate touch area.

In the example of FIG. 5, the smartphone 556 may enter a cleaning mode 564. While in the cleaning mode 564, the smartphone 556 may detect a cleaning contact(s). For instance, a user may use a cleaning cloth to contact (e.g., clean) the touchscreen as illustrated in FIG. 5. In the area(s) where a cleaning contact occurs, the opacities of the dots may be reduced. In the cleaning mode 564, for example, the smartphone 556 may detect that a user is cleaning and mopping the touchscreen, and may decrease the opacities and/or intensities when detecting the cleaning contacts.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be implemented within the scope of the disclosure. For example, aspects or elements of the examples described herein may be omitted or combined.

The invention claimed is:

1. A method, comprising:

detecting, by a processor, bodily contact on a surface based on sensor data, the surface comprising a screen;

producing a determination that a first portion of the screen has reached a threshold dirty state;

moving a user interface from the first portion to a second portion of the screen in response to the determination;

determining, by the processor, a cleanliness state associated with the surface based on the detected bodily contact;

generating, by the processor, a visualization of the cleanliness state; and outputting the visualization.

2. The method of claim 1, further comprising:

entering a cleaning mode;

determining a change in the cleanliness state; and modifying the visualization to indicate the change in the cleanliness state.

3. The method of claim 2, wherein determining the change in the cleanliness state comprises detecting a cleaning contact based on second sensor data.

4. The method of claim 2, wherein modifying the visualization comprises reducing an opacity of the visualization.

5. The method of claim 1, further comprising:

adjusting the cleanliness state based on a quantity of time after the bodily contact without further bodily contact; and modifying the visualization based on the cleanliness state.

6. The method of claim 1, wherein the surface is a non-touch sensitive surface within a field of view of an image sensor that provides the sensor data.

7. The method of claim 6, wherein detecting the bodily contact comprises utilizing computer vision on the sensor data to infer the bodily contact.

8. The method of claim 1, wherein the bodily contact is associated with a first user, and wherein the method further comprises detecting a second bodily contact associated with a second user, wherein the visualization comprises a first indicator corresponding to the first user and a second indicator corresponding to the second user.

9. An apparatus, comprising:

a memory; and a processor coupled to the memory, wherein the processor is to:

produce a detection of a bodily contact on a surface based on sensor data;

determine a cleanliness state associated with the surface based on the detected bodily contact;

generate a visualization of a cleanliness state; and adjust the cleanliness state based on a quantity of time after the bodily contact without further bodily contact; and modifying the visualization based on the adjusted cleanliness state.

10. The apparatus of claim 9, wherein the processor is to adjust the visualization by changing an opacity of the visualization based on a change in the cleanliness state.

11. The apparatus of claim 9, wherein a change in the cleanliness state occurs in a cleaning mode.

12. A non-transitory tangible computer-readable medium comprising instructions when executed cause a processor of an electronic device to:

detect a first bodily contact on a touchscreen based on sensor data, the first bodily contact being associated with a first user;

determine a cleanliness state associated with the touchscreen based on the detected bodily contact;

detecting a second bodily contact associated with a second user, generate a visualization of the cleanliness state, wherein the visualization comprises a first indicator corresponding to the first user and a second indicator corresponding to the second user; and display the visualization.

13. The non-transitory tangible computer-readable medium of claim 12, further comprising instructions when executed cause the processor of the electronic device to:

produce a determination that the cleanliness state has reached a threshold dirty state; and display a notification in response to the determination.

14. The non-transitory tangible computer-readable medium of claim 12, wherein the visualization is positioned at a location of the detected bodily contact on the touchscreen.

15. The method of claim 1, wherein the visualization of the cleanliness state depicts dots on a display panel; and wherein the display panel includes the surface.

16. The method of claim 1, further comprising:

automatically entering a cleaning mode, while in the cleaning mode:

suspending, by the processor, a display of an application on a display panel, the display panel including the surface;

detecting, by the processor, the bodily contact on the surface based on the sensor data;

determining, by the processor, the cleanliness state associated with the surface based on the detected bodily contact;

generating, by the processor, the visualization of the cleanliness state; and outputting the visualization to the display panel.

17. The method of claim 16, further comprising:

determining a change in the cleanliness state; and unsuspending the display of the application on the display panel, based on the determining the change in the cleanliness state.

18. The method of claim 1, further comprising detecting that the bodily contact on the surface is a cleaning contact, based only on the sensor data.

19. The apparatus of claim 9, further comprising a touchscreen than includes the surface;

wherein the visualization of the cleanliness state includes a distribution of dots; and wherein an opacity of each dot of the distribution of the dots depends on the cleanliness state associated with a location of the touchscreen that includes the respective dot.

20. The non-transitory tangible computer-readable medium of claim 12, wherein the visualization varies based on a location of the detected bodily contact.

* * * * *